United States Patent [19]

Papesh

[11] Patent Number: 4,961,266
[45] Date of Patent: Oct. 9, 1990

[54] AUTO BODY REPAIR GAUGE ASSEMBLY
[76] Inventor: Thomas S. Papesh, 1915 N. Broadway, Crest Hill, Ill. 60435
[21] Appl. No.: 347,130
[22] Filed: May 4, 1989
[51] Int. Cl.$^5$ ............................. G01B 5/14; G01B 5/25
[52] U.S. Cl. .......................................... 33/288; 33/608
[58] Field of Search ................ 33/288, 286, 608, 612, 33/645, 810, 203.18, 203.20

[56] References Cited

U.S. PATENT DOCUMENTS

| | | | |
|---|---|---|---|
| 2,176,215 | 10/1939 | Falge | 33/645 |
| 3,445,936 | 5/1969 | Wilkerson | 33/203.18 |
| 4,321,754 | 3/1982 | Colby | 33/288 |
| 4,329,784 | 5/1982 | Bjork | 33/288 |
| 4,561,187 | 12/1985 | Powell | 33/288 |
| 4,598,481 | 7/1986 | Donahue | 33/288 |
| 4,689,888 | 9/1987 | Aldrich et al. | 33/288 |
| 4,691,443 | 9/1987 | Hamilton et al. | 33/288 |
| 4,703,563 | 11/1987 | Hoshino et al. | 33/288 |
| 4,719,704 | 1/1988 | Hogg | 33/288 |

*Primary Examiner*—William A. Cuchlinski, Jr.
*Assistant Examiner*—Christopher W. Fulton
*Attorney, Agent, or Firm*—Ernest Kettelson

[57] ABSTRACT

An auto body repair gauge assembly comprises a frame or jig having a pair of spaced apart longitudinal bars supporting two or more lateral bars slidably mounted thereon for placing over the engine compartment of a motor vehicle whose body has been bent or otherwise damaged. Marking rods are slidably mounted on the lateral bars for positioning at the points indicating where a damaged part of the vehicle body should be adjusted to be back in its original correct position. The longitudinal and lateral bars have measurement indications marked on at least one side so the workmen can tell where to slide the marking rods. One lateral bar farthest to the rear is the reference bar and has its center lined up with the true longitudinal center line of the vehicle. The longitudinal bars extend from that reference lateral bar at true right angles so that they are in true parallel with the longitudinal center line of the vehicle, and the rest of the lateral bars intersect the longitudinal center line of the vehicle at right angles. Centering pins are placed through the center of each of the lateral bars in line with the true longitudinal center line of the vehicle. Such center pins are the points of reference for each lateral bar to determine how far from center each of the respective marking rods are to be set to indicate the correct location of each vehicle body part to be moved from a damaged to a correct position.

15 Claims, 5 Drawing Sheets

AUTO BODY REPAIR GAUGE ASSEMBLY

BACKGROUND OF THE INVENTION

This invention relates to the field of measuring and locating devices for use in auto body repair work to indicate the correct location to which a damaged part of the vehicle has to be moved to get back to its original correct position. In particular it relates to a measuring and locating device for use above the engine compartment in the front of the vehicle to more easily and more accurately determine the correct location for the right and left strut towers which hold the upper mounting plates for the vehicle's shock absorbers and for the right and left radiator core supports, using the rearward right and left cowl apertures as the control points or original points of reference.

Various arrangements of intersecting bars and rods assembled into a frame or jig are known and used for aligning parts of machines which have gotten out of alignment, including for use in making the correct wheel alignment of vehicles wherein a vertical bar is positioned adjacent each wheel to be aligned as a point of reference and short horizontal measuring rods are then extended from the vertical reference bar to the vehicle wheel at the top, bottom, forward and rearward portions whereupon it can be determined if the wheel is in the correct position at each point, and if not the horizontal measuring rods show how far each portion has to be moved to be brought back into correct alignment.

Intersecting bars and rods assembled into a jig or frame that is appropriate for underbody repair work are also known, such as for clamping to the underbody pinch weld on each side of an auto and suspending a lateral measuring bar across the underside of the vehicle whereby the correct position of a bent portion of the underbody can be determined to tell how far it will have to be moved to get it back into its correct position.

However, as far as the inventor knows, a frame or jig for conveniently locating the correct positions for the left and right strut towers, the left and right radiator core supports, as well as the left and right cowl apertures, all at one time by laying above the open engine compartment has not been known or previously used. Prior art methods for determining correct positions for these parts of the vehicle body include use of an individual yardstick or other measuring device to measure each item separately from a known reference point, using a specification reference book which shows the correct distances between the respective parts of the various vehicles to be worked on.

An advantage of the present invention, and an improvement over the prior art method of determining the correct locations of the strut towers, radiator core supports and cowl mounting apertures is that the correct location of all of these parts can be determined together by the same frame or jig assembly, including their correct positions relative to each other, and the frame or jig can be left in place to continually indicate the correct positions for all of such parts while each one is being pulled, pushed, bent or otherwise moved back to its correct position. This avoids the possibility that one part which had previously been moved to its correct position might be moved partially out of such correct position when force is being applied to move another part into correct position.

SUMMARY OF THE INVENTION

It is an object of the invention to provide an auto body repair gauge assembly whereby upper body vehicle parts including the right strut tower, left strut tower, right radiator core support, left radiator core support, right cowl mounting aperture and left cowl mounting aperture can all have their correct positions marked at the same time relative to both an original reference point and to each other, and in which all of such correctly marked positions remain in place while each of such parts which need to be moved are moved into their respective correct positions.

It is an object of the invention to provide an auto body repair gauge assembly for determining the correct positions for the strut towers, radiator core supports and cowl mounting apertures and holding all of such correct positions while respective ones of such parts are being moved into correct position, wherein such assembly includes a pair of spaced apart longitudinal bars and a plurality of lateral measuring bars slidably mounted thereon, including right angular tubular sleeve members having offset sleeve axes to enable such longitudinal and lateral bars received therein to all be able to slide relative to each of the others.

DESCRIPTION OF PREFERRED EMBODIMENT

Figure 1:
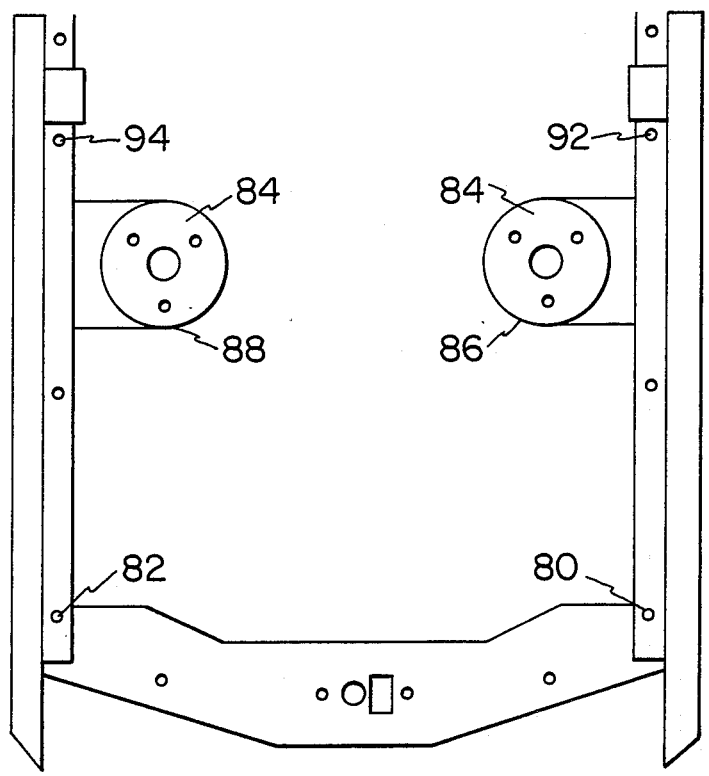
FIG. 1 is a top plan view of the engine compartment of a motor vehicle in which the engine itself has been removed, showing the location of the rear cowl mounting apertures, the strut towers which support the plates to which the upper portion of the front wheel shock absorbers are secured, and the radiator core supports to which the frame of the radiator core is bolted.
Figure 2:
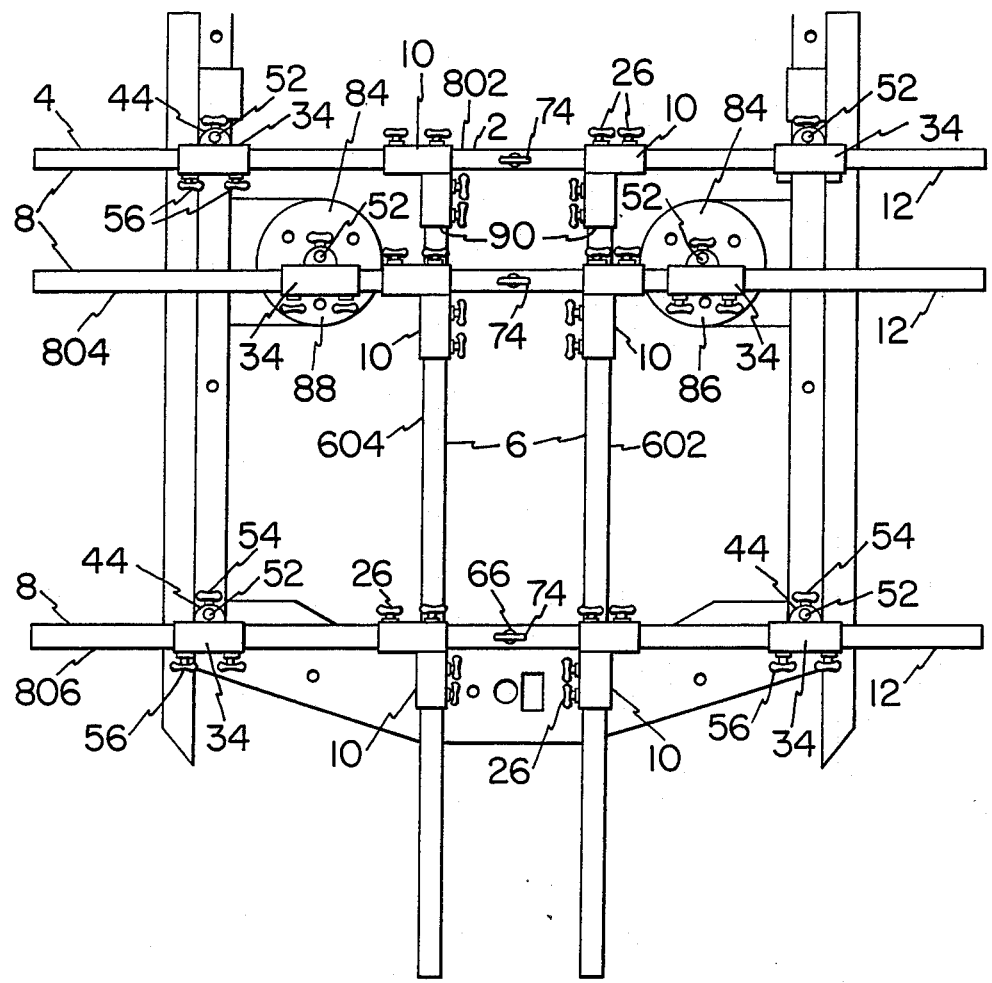
FIG. 2 is a top plan view as seen in FIG. 1 having an auto body repair gauge assembly in accordance with this invention in place thereon.
Figure 3:
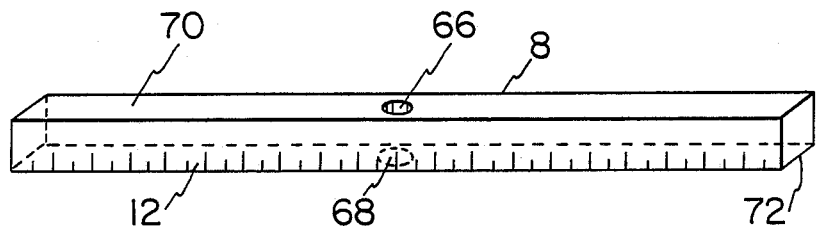
FIG. 3 is a perspective view of one of the lateral measuring bars.
Figure 4:
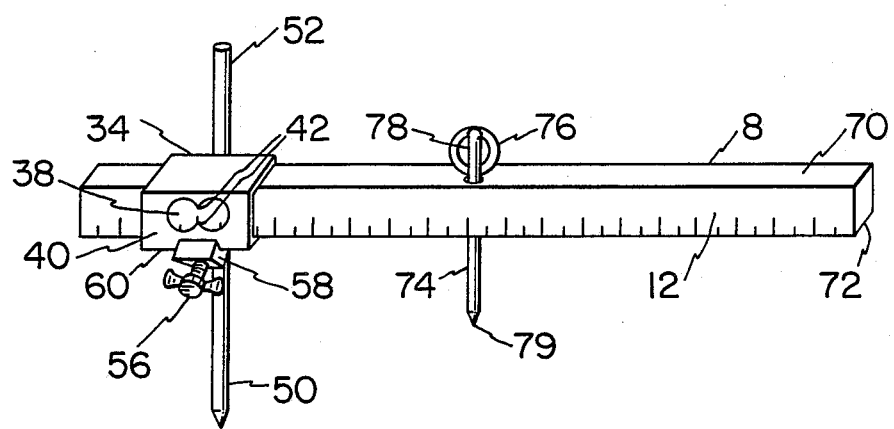
FIG. 4 is a perspective view of the lateral measuring bar of FIG. 3 having a marking sleeve and pointer slidably mounted thereon and a centering pin through the center of the bar.
Figure 5:
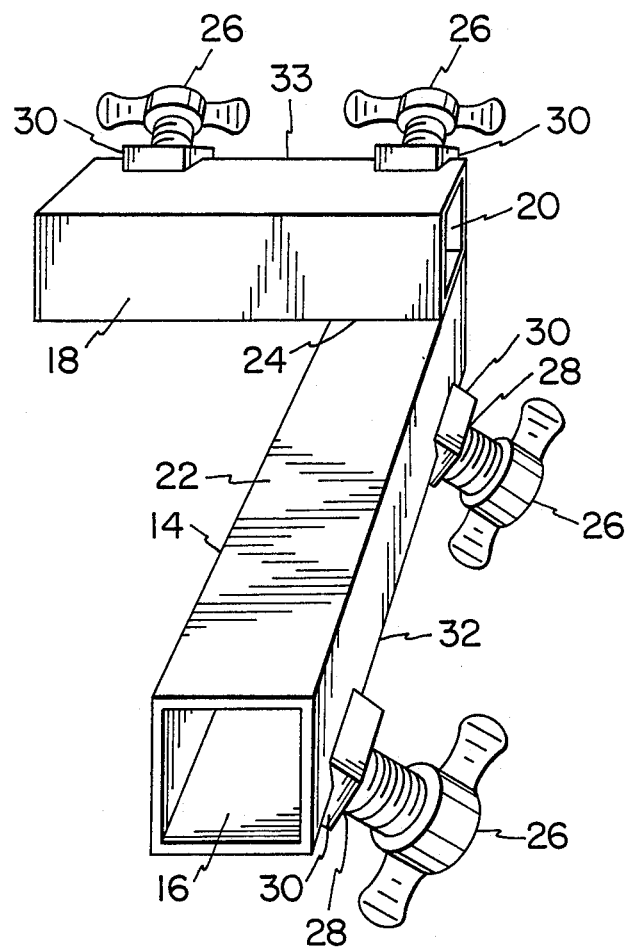
FIG. 5 is a perspective view of one of the right angle tubular sleeve members in accordance with this invention having offset tubular channels and oblique angle corner mounted set screws.
Figure 6:
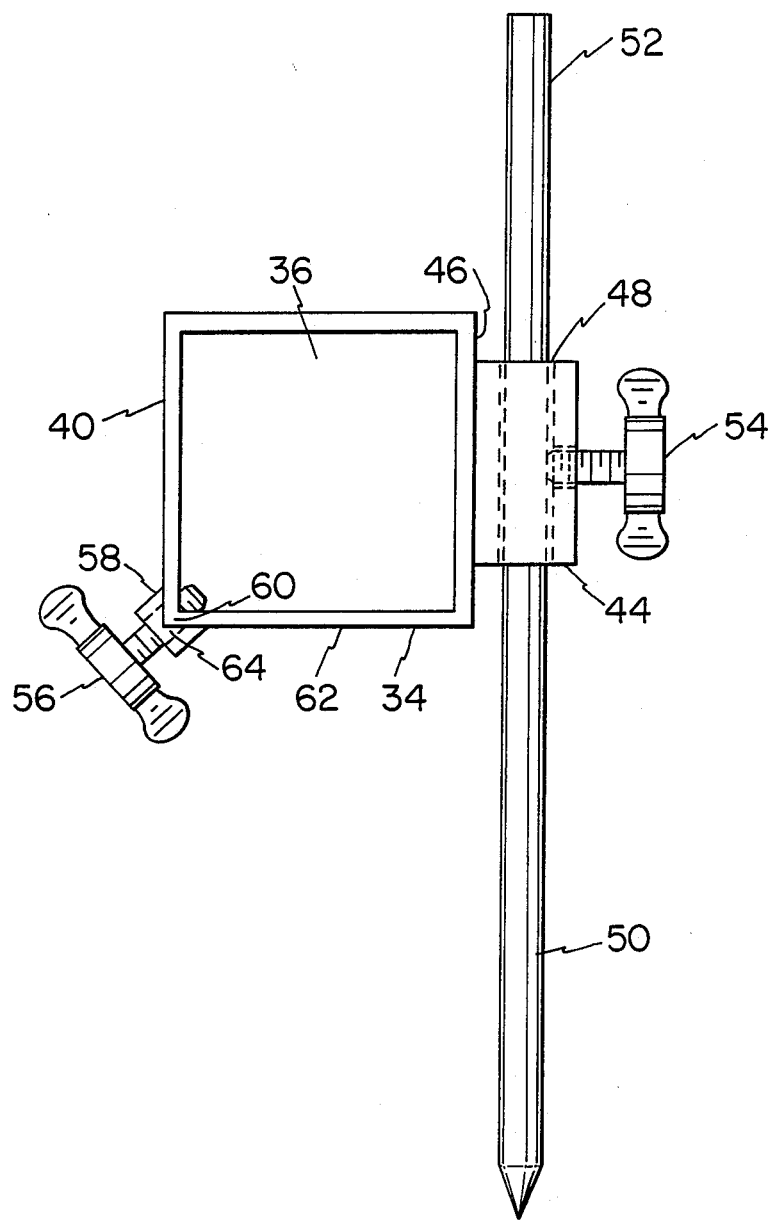
FIG. 6 is a side elevation view of a marking sleeve as also shown in FIG. 4 slidably mounted on the lateral measuring bar.

A tram bar gauge assembly 2 for use in auto body repair in accordance with this invention comprises an adjustable frame or jig 4 having a pair of longitudinally extending measuring bars 6, two or more laterally extending measuring bars 8, and a plurality of right-angle sleeve members 10 to connect the longitudinal bars 6 and lateral bars 8 together in such a way that they are adjustable both laterally and longitudinally relative to each other.

The longitudinal bars 6 are held at right angles to the lateral bars 8 by the right-angle sleeve members 10. Thus, for use in repair of damaged auto bodies, one of the laterally extending measuring bars 8 may be set above an undamaged portion of the vehicle in a lateral position which is perpendicular to the true longitudinal center line of the vehicle. The longitudinally extending bars 6 can then be directed forwardly or horizontally above the engine compartment whereby they will be held parallel to the true longitudinal center line of the vehicle by the right-angle sleeve members 10.

A second laterally extending measuring bar 8 adjustably connected to the longitudinal bars 6 by right-angle sleeve members 10 can then be moved to a damaged portion of the vehicle by sliding along the longitudinal bars 6. The center of the second laterally extending measuring bar 8 is originally aligned with the true longitudinal center line of the vehicle before sliding it to the damaged portion. When it reaches the damaged portion by sliding on the longitudinal bars 6 which are held parallel to the true longitudinal center line, the center of the second laterally extending measuring bar 8 will show where the true longitudinal center line of the vehicle should be. Measurements can then be made from the center line to mark where the damaged portion of the vehicle body should be by referring to specifications for the particular vehicle being worked on. While the jig 4 is still in place, the damaged portion of the vehicle body can then be moved laterally by use of appropriate vehicle body straightening equipment until it comes into precise alignment with the marked point on the second laterally extending measuring bar showing where it should be.

Additional laterally extending measuring bars 8 can be mounted on the longitudinal bars 6 ahead of the second lateral bar 8 to locate the exact position where other damaged portions of the vehicle body should be moved.

The longitudinal bars 6 and lateral bars 8 are elongated, have a substantially square cross-section with four substantially equal flat sides including a marked flat side 12 on which measuring increments are marked in both inches and metric units.

The right-angle sleeve members 10 each include a first tubular length 14 of substantially square cross-section having a through cavity 16 that has a cross-sectional dimension and configuration corresponding to that of the longitudinal bars 6 to slidingly receive respective ones therethrough. A second tubular length 18 of substantially square cross-section having a through cavity 20 with a cross-sectional configuration and dimension corresponding to that of the lateral bars 8 to slidingly receive respective ones therethrough is welded or otherwise affixed to the first tubular length 14 in such a position that the longitudinal axis of the through cavity of each extends perpendicular to that of the other.

The tubular lengths 14 and 18 which make up each right-angle sleeve member 10 are welded together, or otherwise affixed together, with a side wall 22 of tubular length 14 abutting against a side wall 24 of tubular length 18, whereby the through cavities 16 and 20 are offset. By this construction of the right-angle sleeve members 10, the longitudinal bar 6 through cavity 16 and the lateral bar 8 through cavity 20 are able to clear each other whereby both can slide freely relative to each other along respective offset axes which are normal one to the other.

One or more set screws 26 are provided through internally threaded bores 28 extending through a side wall portion of the tubular lengths 14 and 18. An integrally formed projecting base member 30 is provided at the junction 32 of adjoining side walls of tubular length 14 and at the junction 33 of adjoining side walls of tubular length 18. The internally threaded bores 28 extend through respective ones of the projecting base members 30 at a diagonal to the side walls of the tubular lengths 14 and 18, and open to the corner portions of the respective longitudinal bars 6 and lateral bars 8 received in the respective through-cavities 16 and 20. When the set screws 26 are threaded in their respective internally threaded bores 28 and tightened down, they bear against a corner portion of the measuring bars 6 and 8 rather than against the flat surface areas of the bars. This construction avoids the possibility of a set screw scraping against and obliterating the measurement markings on one of the sides of each bar.

Marking sleeves 34 are provided to slide on the measuring bars 6 and 8 and indicate the desired location thereon as determined from specifications set forth in reference manuals for the vehicles being worked on. The marking sleeves 34 are substantially square in cross-section, having a through-cavity 36 with a cross-sectional dimension and configuration corresponding to that of the respective measuring bars 6 and 8 on which they are to be used. An aperture 38 is provided through side wall 40 to view the measurement markings on side wall 12 of the measuring bars 6 and 8. Opposed points 42 extend from opposite side edges of the aperture 38 to align with a specific measurement mark. An integrally connected pointer holder 44 extends from the opposite side wall 46 and is located thereon opposite the aperture 38 through side wall 40. An elongated bore 48 is provided through the pointer holder 44 to receive the stem 50 of an elongated pointer 52. The longitudinal axis of the bore 48 is in line with the opposed points 42 of aperture 38 and extends parallel to an imaginary line between the opposed points 42. Thus, when marking sleeve 34 is moved along a respective marking bar 6 or 8 until the opposed points 42 of aperture 38 are aligned with a selected measurement mark, the elongated pointer 52 received in the bore 48 and extending upwardly therefrom is also in line with such selected measurement mark. The pointer 52 can also be received in bore 48 to point downwardly from the marking sleeve 34 and the measuring bar 6 or 8 on which it is positioned.

A set screw 54 is provided through the wall of the pointer holder 44 to hold the pointer 52 in bore 48 at whatever height setting is selected.

The marking sleeves 34 are also provided with set screws 56. An integrally formed projecting base member 58 is provided at the junction 60 of adjoining side walls 40 and 62. An internally threaded bore 64 extends through the projecting base member 58 at a diagonal to side walls 40 and 62, and opens to the corner portion of the respective longitudinal bars 6 and lateral bars 8 received in through-cavity 36. When the set screw 56 is threaded in the internally threaded bore 64 and tightened down, it bears against a corner portion of the measuring bar received through the marking sleeve 34 and does not bear against or deface any portion of the side wall of the measuring bar which has the measuring marks thereon.

Each laterally extending measuring bar 8 includes a pair of aligned apertures 66 and 68 through respective ones of opposed side walls 70 and 72 which extend from and normal to side wall 12 on which the measurement marks are provided, such apertures 66 and 68 being centered on the center line of the measuring bar 8 and axially aligned on an axis which extends perpendicular to the axis of the measuring bar 8. A centering pin 74 is provided to seat in the apertures 66 and 68 and extend upwardly from the center of the lateral measuring bar 8. The outer end of the centering pin 74 is provided with a sight comprising a circular ring 76 surrounding the vertical sight bar 78 of the centering pin 74 which extends diametrically across the circle formed by the ring 76. The centering pin 74 extends from the circular ring 76 and terminates at an opposite free end 79.

The tram bar gauge assembly 2 in accordance with this invention may be used as an underhood jig to locate, for example the correct position of an auto's radiator core supports 80 and 82 and upper ends 84 of strut towers 86 and 88 which encompass anchor plates for the upper ends of the vehicle's front wheel shock absorbers. The procedure for accomplishing those objectives is as follows.

A jig 4 is first assembled by placing two longitudinal measuring bars 602 and 604 in spaced apart parallel relationship, placing a right-angle sleeve member 10 on each at their rearward ends 90 with the first tubular lengths 14 of sleeve members 10 receiving respective ones of longitudinal bars 602 and 604 and the second tubular lengths 18 axially aligned laterally to receive a rearwardly positioned lateral measuring bar 802 with its side wall 12 having the measurement markings facing forward.

Marking sleeves 34 are placed on each outer end of lateral bar 802 with their window apertures 38 through side 40 facing the measurement marked side 12 of bar 802 for later positioning at correct marking locations over the vehicle's rear cowl control points 92 and 94 when the assembled jig is placed over the vehicle's engine compartment under the hood, with the hood either raised or removed.

A second pair of right-angle sleeve members 10 are placed on the longitudinal bars 602 and 604 having their laterally extending second tubular lengths 18 axially aligned to receive a second lateral measuring bar 804 with its marked wall 12 facing forward. A second set of marking sleeves 34 are placed on the respective outer ends of bar 804 for later positioning at correct marking locations for the strut towers 86 and 88, the window apertures 38 through side 40 of marking sleeves 34 facing the measurement marked side 12 of bar 804.

A third pair of right-angle sleeve members 10 are next placed on the longitudinal bars 602 and 604 having their laterally extending second tubular lengths 18 axially aligned to receive a third lateral measuring bar 806 with its marked wall 12 facing forward. A third set of marking sleeves 34 is placed on the respective outer ends of bar 806 for later positioning at correct marking locations for the radiator core supports 80 and 82, with the window apertures 38 through side 40 of marking sleeves 34 facing the measurement marked side 12 of lateral bar 806.

The jig 4 as thus assembled, is placed in a generally horizontal position over the engine compartment of the vehicle with its hood either raised or removed, with the longitudinal bars 602 and 604 extending longitudinally of the vehicle and lateral bars 802, 804 and 806 extending laterally of the vehicle, lateral bar 802 being toward the rear and lateral bar 806 being toward the front.

The workman then slides lateral bar 802 on the longitudinal bar 602 and 604 until it overlays the rear cowl control points 92 and 94. He then removes the bolts from the selected cowl control points 92 and 94, each of which is equidistant from the true longitudinal center line of the vehicle. The center of bar 802 is aligned with the true longitudinal center line. Pointers 52 are then placed through the bore 48 of pointer holder 44 of the marking sleeves 34 with their points extending downwardly and centered in the rear cowl control points 92 and 94. The set screws are tightened to hold the marking sleeve and pointer in place.

With the assembled jig 4 in place as described, the center bar 802 on the longitudinal center line of the vehicle and the pointers 52 of each marking sleeve 34 in respective ones of the cowl control points 92 and 94 which themselves are equidistant from the center of bar 802 and the longitudinal center line of the vehicle, the spaced apart longitudinal bars 602 and 604 are parallel to the true longitudinal center line of the vehicle, one on each side thereof.

The workman then slides the second lateral bar 804 on longitudinal bars 602 and 604 until it overlays the strut towers 86 and 88. He slides the third lateral bar 806 until it overlays the radiator core supports 80 and 82. Centering pins 74 are then placed through the aligned apertures 66 and 68 in the center of lateral bars 802, 804 and 806, and they are centered on the true longitudinal center line of the vehicle by sighting through the circular ring 76 of the centering pins 74 using the sight bar 78 through the rear lateral bar 802 as the reference point.

The workman then looks in a reference book which gives the correct specifications and locations of each body part of the vehicle he is working on to see what the correct distance from the vehicle center line should be for the strut towers 86 and 88 and for the radiator core supports 80 and 82. The marking sleeves 34 and downwardly extending pointers 74 therein on lateral bar 804 are moved to such correct points for the strut towers 86 and 88 to show the correct points to which they will have to be moved if they are out of alignment. The marking sleeves 34 and downwardly extending pointers 74 therein on lateral bar 806 are moved to such correct points for the radiator core supports 80 and 82 to show the correct points to which they will have to be moved if they are out of alignment. The respective set screws are tightened down to hold the marking sleeves 34 and their pointers 74 in the correct locations.

The straightening process can then be undertaken with the jig 4 as assembled left in place above the engine compartment with the hood of the vehicle raised or removed. By this method, the workmen can see the exact point to which the strut towers and radiator core supports have to be moved by lining each part up with the respective pointer 74 showing exactly where each part should be.

I claim:

1. An auto body repair gauge comprising an alignment assembly having a lateral dimension at least as great as that of the portion of a vehicle on which it is to be used and a longitudinal dimension corresponding to the longitudinal dimension of the portion of a vehicle on which it is to be used, reference establishment means to place said alignment assembly in alignment with the longitudinal axis of a said vehicle on which it is to be used, and a plurality of location members of said alignment assembly movable laterally and longitudinally thereon relative to said longitudinal axis to locate the correct position of a plurality of portions of a said vehicle on which it is to be used and to hold such correct position for all of said plurality of portions of a said vehicle so located while a one of such portions out of its correct position is moved back into its correct position, wherein said alignment assembly includes a plurality of laterally extending members, each having an elongated dimension corresponding to the said lateral dimension of said alignment assembly and at least one longitudinally extending member having an elongated dimension corresponding to the said longitudinal dimension of said alignment assembly, wherein said longitudinally extending member extends parallel to a vertical plane through said longitudinal axis of a said vehicle on which said alignment assembly is to be used when said reference establishment means thereof has placed said alignment assembly in alignment with said longitudinal axis and in the same longitudinal direction as said longitudinal axis of said vehicle extends, said longitudinally extending member including an upwardly facing surface and a downwardly facing surface when in place on a said vehicle, said downwardly facing surface being in facing relationship with said vehicle throughout its entire extent when in place on said vehicle, a portion thereof being then in contact with a corresponding facing portion of said vehicle and directly supported thereby.

2. An auto body repair gauge as set forth in claim 1, wherein said laterally extending members extend in a direction normal to said longitudinal axis of a said vehicle on which said alignment assembly is to be used when said reference establishment means thereof has placed said longitudinally extending member to extend parallel to and in the same direction as, said longitudinal axis, said laterally extending members being supported above said longitudinally extending member in facing relationship with its said upwardly facing surface whereby said laterally extending members are spaced apart upwardly from said vehicle and out of contact therewith enabling free movement of said laterally extending members to locate the said correct position of a plurality of portions of a said vehicle on which said auto body repair gauge is being used.

3. An auto body repair gauge as set forth in claim 1, wherein said plurality of laterally extending members include a first laterally extending member having a first end and an opposite second end, said reference establishment means includes a first reference establishment member mounted on said first laterally extending member for lateral movement thereon toward and away from said first end thereof, a second reference establishment member mounted on said first laterally extending member for lateral movement thereon toward and away from said second end thereof, a third reference establishment member mounted on said first laterally extending member at a point representing the center thereof, said third reference establishment member to overlie said longitudinal axis of a said vehicle to be worked on when said first laterally extending member is placed on said vehicle with said first end thereof on one side of said longitudinal axis and said second end thereof on the opposite side of said longitudinal axis, said first reference establishment member being movable to a first reference point on said vehicle, said second reference establishment member being movable to a second reference point on said vehicle, said longitudinally extending member being parallel to said longitudinal axis of said vehicle when said first and second reference establishment members are moved to said first and second reference points of said vehicle respectively.

4. An auto body repair gauge as set forth in claim 3, wherein said plurality of laterally extending members include a second laterally extending member having a first end and an opposite second end, said longitudinally extending member having a first end and an opposite second end, said first end of said longitudinally extending member being closer to said first laterally extending member than said second end of said longitudinally extending member, said second laterally extending member being mounted on said longitudinally extending member for longitudinal movement thereon toward and away from said first laterally extending member, said first end of said second laterally extending member being on one side of said longitudinal axis of a said vehicle to be worked on when said alignment assembly is placed thereon in alignment with its said longitudinal axis, said second end of said second laterally extending member being then on the opposite side of said longitudinal axis, said plurality of location members including a first location member mounted on said second laterally extending member for lateral movement thereon toward and away from said first end of said second laterally extending member, a second location member mounted on said second laterally extending member for lateral movement thereon toward and away from said second end of said second laterally extending member, said first location member being movable to locate the correct position of a first portion of said vehicle relative to said first and second reference points, said second location member being movable to locate the correct position of a second portion of said vehicle relative to said first and second reference points.

5. An auto body repair gauge as set forth in claim 4, wherein said plurality of laterally extending members include a third laterally extending member having a first end and an opposite second end, said third laterally extending member being mounted on said longitudinally extending member for longitudinal movement thereon between said second laterally extending member and said second end of said longitudinally extending member, said first end of said third laterally extending member being on one side of of longitudinal axis of a said vehicle to be worked on when said alignment assembly is placed thereon in alignment with its said longitudinal axis, said second end of said third laterally extending member being then on the opposite side of said longitudinal axis, said plurality of location members including a third location member, said third location member being mounted on said third laterally extending member for lateral movement thereon toward and away from said first end of said third laterally extending member, a fourth location member, said fourth location member being mounted on said third laterally extending member for lateral movement thereon toward and away from said second end of said third laterally extending member, said third location member being movable to locate the correct position of a third portion of said vehicle relative to said first and second reference points, said fourth location member being movable to locate the correct position of a fourth portion of said vehicle relative to said first and second reference points.

6. An auto body repair gauge as set forth in claim 5, wherein said vehicle to be worked on includes a left cowl mounting aperture, a right cowl mounting aperture, a left strut tower supporting a left front shock absorber mount therein, a right strut tower supporting a right front shock absorber mount therein, a left radiator core support aperture, a right radiator core support aperture, a central aperture in said left strut tower, a central aperture in said right strut tower, said first reference point being said left cowl mounting aperture, said second reference point being said right cowl mounting aperture, said first reference establishment member being centered on said left cowl mounting aperture, said second reference establishment member being centered on said right cowl mounting aperture, said first location member being moved to locate the correct position of said central aperture of said left strut tower relative to said left and right cowl mounting apertures, said second location member being moved to locate the correct position of said central aperture of said right strut tower relative to said left and right cowl mounting apertures, said third location member being moved to locate the correct position of said left radiator core support aperture relative to said left and right cowl mounting apertures, said fourth location member being moved to locate the correct position of said right radiator core support aperture relative to said left and right cowl mounting apertures.

7. An auto body repair gauge as set forth in claim 1, including at least one tubular connecting member having a laterally extending tubular portion to receive one of said laterally extending members therethrough for sliding movement therein, a longitudinally extending tubular portion to receive said longitudinally extending member therethrough for sliding movement therein, the axis of said laterally extending tubular portion being offset from the axis of said longitudinally extending tubular portion, said laterally and longitudinally extending tubular portions being connected in above and below relationship whereby said laterally and longitudinally extending members are slidable in said tubular connecting member in one above the other relationship when said alignment assembly is placed on a said vehicle on which it is to be used.

8. An auto body repair gauge as set forth in claim 7, wherein said laterally and longitudinally extending members comprise elongated bars having a first elongated since wall having a substantially planar surface, a second elongated side wall joined to said first elongated side wall along an angular junction, said laterally extending tubular portion of said tubular connecting member having a first side wall adjacent said first elongated side wall of a said laterally extending member when received therethrough, a second side wall adjacent said second elongated side wall of a said laterally extending member when received therethrough, said first and second side walls of said laterally extending tubular portion of said tubular connecting member being joined along an angular junction, at least one internally threaded aperture extending through said angular junction of said laterally extending tubular portion of said tubular connecting member opening inwardly to said angular junction of a said laterally extending member received in said laterally extending tubular portion of said tubular connecting member, an externally threaded set screw in said internally threaded aperture having an inwardly directed free end to bear against said angular junction of said laterally extending member when tightened to hold said laterally extending member against lateral movement relative to said laterally extending tubular portion of said tubular connecting member.

9. An auto body repair gauge as set forth in claim 8, wherein said location members include a tubular location member to receive a one of said laterally extending members therethrough, said tubular location member having a first side wall adjacent said first elongated side wall of a said laterally extending member when received therethrough, a second side wall adjacent said second elongated side wall of a said laterally extending member when received therethrough, said first and second side walls of said tubular location member being joined along an angular junction, an internally threaded aperture extending through said angular junction of said tubular location member opening inwardly to said angular junction of a said laterally extending member when received therethrough, an externally threaded set screw in said internally threaded aperture of said tubular location member having an inwardly directed free end to bear against said angular junction of said laterally extending member when tightened to hold said tubular location member against lateral movement relative to said laterally extending member received therethrough.

10. An auto body repair gauge as set forth in claim 9, wherein said first elongated side wall of said laterally extending members includes measurement markings on said planar surface thereof, said first side wall of said tubular location member includes a location aperture therethrough to see said measurement markings on said planar surface of said first elongated side wall when received in said tubular location member.

11. An auto body repair gauge as set forth in claim 10, wherein said location aperture includes pointer means to register with respective individual ones of said measurement markings on said planar surface of said first elongated side wall of a said laterally extending member received in said tubular location member.

12. An auto body repair gauge as set forth in claim 11, wherein said pointer means includes a pair of oppositely positioned pointed wall portions of said first side wall of said tubular location member extending inwardly of said location aperture, each terminating in a pointed free end in line with each other and spaced apart from each other.

13. An auto body repair gauge as set forth in claim 9, wherein said tubular location member includes a mounting bracket for a pointer and an elongated pointer held by said mounting bracket for positioning in registration with the correct position of respective ones of said portions of a said vehicle on which said alignment assembly is to be used.

14. An auto body repair gauge as set forth in claim 3, wherein said third reference establishment member comprises a sight member, said sight member including an elongated shank having a first end and an opposite second end, an arcuate member at said first end of said shank, a sight element extending into the area bounded by said arcuate member, at least one of said laterally extending members having a recess to receive said shank of said sight member for positioning over the said longitudinal axis of a said vehicle on which said alignment assembly is to be used.

15. An auto body repair gauge as set forth in claim 1, wherein said alignment assembly includes a plurality of laterally extending members, each having an elongated dimension corresponding to the said lateral dimension of said alignment assembly and a pair of longitudinally extending members, each having an elongated dimension corresponding to the said longitudinal dimension of said alignment assembly.

* * * * *

UNITED STATES PATENT OFFICE
CERTIFICATE OF CORRECTION

Patent No. 4,961,266       Dated October 9, 1990

Inventor(s) Thomas S. Papesh

It is certified that error appears in the above-identified patent and that said Letters Patent is hereby corrected as shown below:

Column 9, line 35,
   Claim 8, line 4, before "wall" delete

"since" and change to - -side- -, so it reads

- -side wall- - rather than "since wall"

Signed and Sealed this

Fourteenth Day of January, 1992

Attest:

HARRY F. MANBECK, JR.

Attesting Officer        Commissioner of Patents and Trademarks